United States Patent Office 2,857,423
Patented Oct. 21, 1958

2,857,423

PROCESS FOR THE MANUFACTURE OF CAROTENOIDS AND INTERMEDIATES THEREFOR

Otto Isler, Marc Montavon, and Rudolf Ruegg, Basel, and Paul Zeller, Neuallschwil, Switzerland, assignors to Hoffmann-La Roche Inc., Nutley, N. J., a corporation of New Jersey No Drawing. Application August 23, 1956
Serial No. 605,717

Claims priority, application Switzerland August 31, 1955

20 Claims. (Cl. 260—488)

This invention relates to novel chemical syntheses and to novel chemical compounds useful as intermediates therein. More particularly, the invention relates to the synthesis of β-carotene, 3,4-3′,4′-bisdehydro-β-carotene, zeaxanthin, lycopene and the 15,15′-dehydro analogs of those compounds. [In those nomenclatures employed in the instant disclosure wherein $C_{40}$ carotenoid compounds are named on the basis of carotene as a reference structure, the numbers are applied to the 40 carbon atoms of the fundamental corotene carbon skeleton according to the numbering system shown in Liebigs Annalen der Chemie, volume 573, p. 3 (1951), as a model.]

The overall process encompassed by the present invention may be broadly described as comprising the following procedure. A 3,8-dimethyl-2,9-di-loweralkoxy-1,3,5,7,9-decapentaene or a 3,8-dimethyl-2,9-di-loweralkoxy-1,3,7,9-decatetraen-5-yne (referred to for convenience as dienol ethers) is condensed bilaterally with a $C_{14}$-acetal of the type characterized hereinafter, (i. e. one molecule of dienol ether with two molecules of $C_{14}$-acetal). The $C_{40}$-hexaalkoxy-compound obtained as a condensation product is treated with acid to produce a $C_{40}$-6,13-diketone which, in turn, is reduced to the corresponding $C^{40}$-6,13-diol. The $C_{40}$-6,13-diol thus obtained is subjected to dehydration, splitting off two molecules of water and undergoing concomitant allyl rearrangement, to obtain the $C_{40}$-carotenoids described above. If desired, the 6,13-diol may be esterified prior to the final dehydration. Where a 3,8-dimethyl-2,9-di-loweralkoxy-1,3,7,9-decatetraen-5-yne is used as one of the initial reactants, a 15,15′-dehydro carotenoid is obtained as the product. This may be partially hydrogenated on the triple bond and isomerized to obtain the same end product as obtained by the use of a 3,8-dimethyl-2,9-di-loweralkoxy-1,3,5,7,9-decapentaene initially.

The process may be represented by the following flow diagram in which the synthesis leading to β-carotene is used as illustrative ($R^3$ representing a lower alkyl radical):

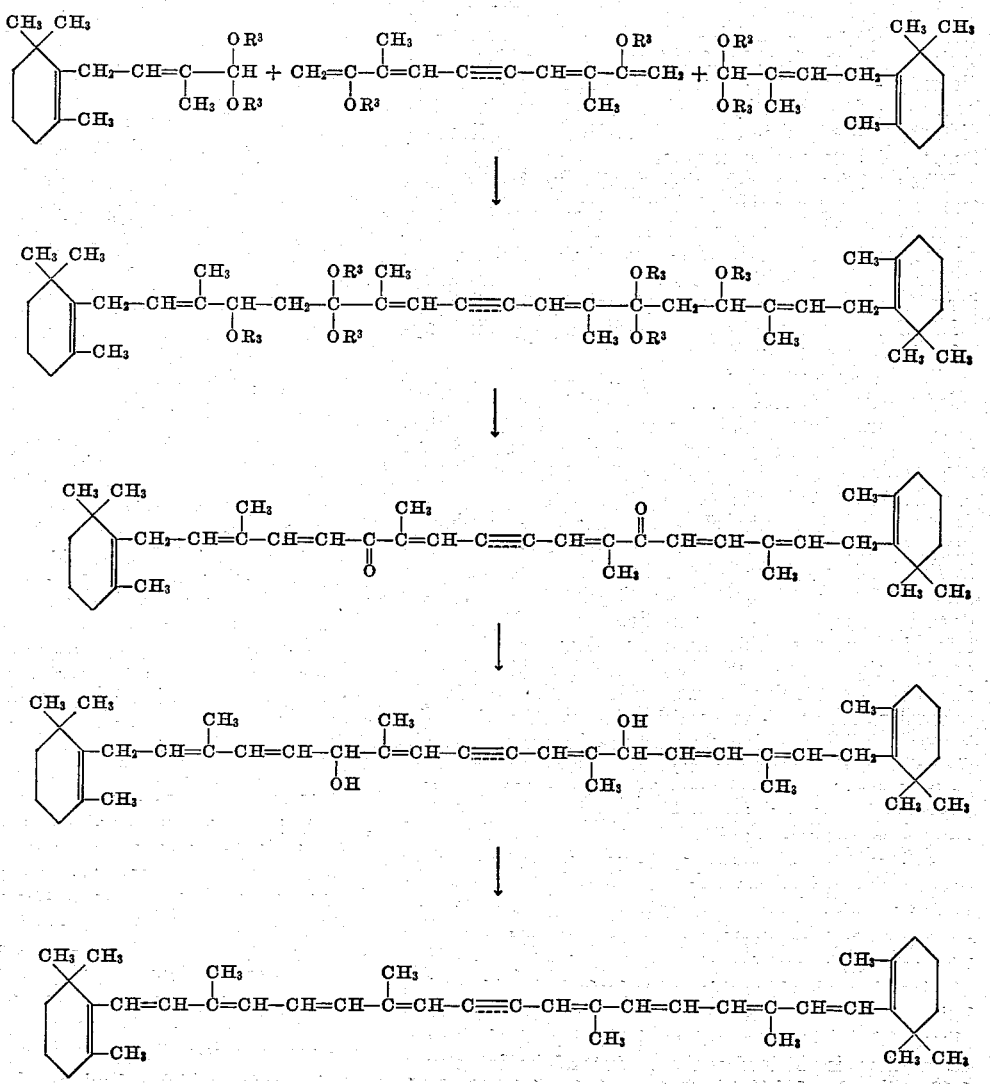

$C_{14}$-acetals which may be initially condensed bilaterally with one of the dienol ethers referred to above, are 1,1-di-loweralkoxy-2-methyl-4-R-2-butenes wherein R represents a member of the group consisting of the radicals 2,6,6-trimethyl-4-$R^1$-1-cyclohexylidene, 2,6,6-trimethyl-4-$R^2$-1-cyclohexen-1-yl, 2,6,6-trimethyl-1,3-cyclohexadien-1-yl and 2,6,6-trimethyl-5-hexen-1-ylidene, wherein $R^1$ represents a member of the group consisting of hydrogen, oxo, hydroxy and acyloxy and $R^2$ represents a member of the group consisting of hydrogen, hydroxy and acyloxy. Representative acyl groups are aliphatic alkanoyl groups such as acetyl or palmitoyl. Illustrative examples of the $C_{14}$-acetals which may be used as starting materials in the process of this invention (and the final product which may be obtained when that acetal is condensed with a 3,8-dimethyl-2,9-di-loweralkoxy-1,3,5,7,9-decapentane) include, 1,1-diethoxy-4-(2,6,6-trimethyl-1-cyclohexen-1-yl)-2-methyl-2-butene ($\beta$-carotene), 1,1-diethoxy-4-(2,6,6-trimethyl-1-cyclohexylidene)-2-methyl-2-butene ($\beta$-carotene), 1,1-diethoxy-4-(2,6,6-trimethyl-1,3-cyclohexadien-1-yl)-2-methyl-2-butene (3,4-3',4'-bis-dehydro-$\beta$-carotene), 1,1-diethoxy-4-(2,6,6-trimethyl-4-oxo-1-cyclohexylidene)-2-methyl-2-butene (zeaxanthin), 1,1-diethoxy-4-(2,6,6-trimethyl-4-oxo-1-cyclohexen-1-yl)-2-methyl-2-butene (zeaxanthin), 1,1-diethoxy-4-(2,6,6-trimethyl-4-acetoxy-1-cyclohexylidene)-2-methyl-2-butene (zeaxanthin), 1,1-diethoxy-4-(2,6,6-trimethyl-4-acetoxy-1-cyclohexylidene)-2-methyl-2-butene(zeaxanthin),1,1-diethoxy-4-(2,6,6-trimethyl-4-acetoxy-1-cyclohexen-1-yl)-2-methyl-2-2-butene (zeaxanthin), 1,1-diethoxy-4-(2,6,6-trimethyl-4-hydroxy-1-cyclohexylidene)-2-methyl-2-butene (zeaxanthin), 1,1-diethoxy-4-(2,6,6-trimethyl-4-hydroxy-1-cyclohexen-1-yl)-2-methyl-2-butene (zeaxanthin), 1,1-diethoxy-4-(2,6,6-trimethyl-5-hexen-1-ylidene)-2-methyl-2-butene (lycopene), etc.

When a 3,8-dimethyl-2,9-di-loweralkoxy-1,3,7,9-decatetraen-5-yne is condensed bilaterally with the $C_{14}$-acetals enumerated above, the respective 15,15'-dehydro analogs of the final products indicated are then obtained.

The preferred dienol ethers used as starting materials for the present process are 3,8-dimethyl-2,9-diethoxy-1,3,5,7,9-decapentaene and 3,8-dimethyl-2,9-diethoxy-1,3,7,9-decatetraen-5-yne.

The end products obtained according to the method of this invention are useful as coloring agents for foodstuffs, e. g. butter, cheese and margarine, and for feedstuffs, imparting a yellow-orange color. $\beta$-carotene, 3,4-3',4'-bis-dehydro-$\beta$-carotene, also possess the biological activity characteristic of vitamin A.

In the first stage of a detailed procedure according to the present invention, a dienol ether of the class characterized above is condensed bilaterally in the presence of an acid condensation agent with a $C_{14}$-acetal of the class described above. As condensation agents for the first step of the process there may be used metal halide acid condensation agents such as boron trifluoride etherate, zinc chloride, titanium tetrachloride, ferric chloride, tin tetrachloride, etc. The condensation is effected at the lowest possible reaction temperature in order to avoid undesirable side reactions such as polymerization. The optimal reaction temperatures lie between 15° and 50°, depending on the choice of condensation agent and the starting materials used.

According to a preferred modification, one mol of dienol ether and two mols of $C_{14}$-acetal are reacted at 20° to 40° in an inert solvent such as petroleum ether in the presence of zinc chloride or boron trifluoride etherate. The solution containing the condensation product thus obtained is preferably subjected to hydrolysis without isolation or purification. If 3,8-dimethyl-2,9-di-loweralkoxy-1,3,7,9-decatetraen-5-yne is condensed with a $C_{14}$-acetal, there is obtained as the product of the first step, a 1,18 - di - R - 3,7,12,16 - tetramethyl - 4,6,6,13,13,15-hexa - loweralkoxy - 2,7,11,16 - octadecatetraen - 9 - yne, wherein R corresponds to the configuration of the $C_{14}$-acetal starting material as defined above. When 3,8-dimethyl - 2,9 - di - loweralkoxy - 1,3,5,7,9 - decapentaene is condensed with a $C_{14}$-acetal, the product of the first step is a 1,18 - di - R - 3,7,12,16 - tetramethyl - 4,6,6,13,13,15-hexa-loweralkoxy-2,7,9,11,16-octadecapentaene wherein R corresponds to the configuration of the $C_{14}$-acetal starting material as defined above. The reaction product of the first stage of this process need not be isolated. If desired, the second hydrolysis step of the process may be carried out in the same reaction vessel.

The second stage of the process constitutes hydrolysis of the reaction product obtained in the first stage. The hydrolysis may be carried out, for example, by warming the reaction mixture obtained previously, whereby two mols of alcohol are simultaneously split off from the 4,5 and 14,15 positions and a 6,13-diketone is formed. Hydrolysis may be effected in the presence of water soluble organic or inorganic acids such as p-toluenesulfonic acid, acetic acid, propionic acid, oxalic acid, sulfuric acid and phosphoric acid or in the presence of acid reacting water soluble metal salts such as zinc chloride or sodium bisulfate. Preferably oxygen is excluded from the reaction and an anti-oxidant such as hydroquinone is added. The reaction is preferably carried out under conditions in which the alcohol produced is continuously removed from the reaction mixture. A water miscible solvent such as dioxane, tetrahydrofurane, ethylene glycol dimethyl ether, etc., may be added in order to obtain a homogeneous reaction mixture. The condensation product is preferably warmed to about 100° with dilute phosphoric acid in the presence of a water miscible solvent or with acetic acid with the addition of an alkali acetate and some water. Upon diluting the reaction mixture with water, the 6,13-diketone produced precipitates out. The product may be purified by partitioning between solvents, by chromatography and by crystallization. Depending upon the dienol ether and the $C_{14}$-acetal used as initial starting materials, there are obtained as products of the hydrolysis step, 1,18 - di - R - 3,7,12,16 - tetramethyl - 2,4,7,11,14,16-octadecahexaen - 9 - yne - 6,13 - diones or 1,18 - di - R - 3,7,12,16 - tetramethyl - 2,4,7,9,11,14,16 - octadecaheptaene - 6,13 - diones wherein R has the same significance as discussed above.

In the third stage of the process, the 6,13-diketone obtained above is reduced to the corresponding 6,13-diol, e. g. 1,18 - di - R - 3,7,12,16 - tetramethyl - 2,4,7,11,14,16-octadecahexaen - 9 - yne - 6,13 - diol or 1,18 - di - R - 3,7,12,16 - tetramethyl - 2,4,7,9,11,14,16 - octadecaheptaene-6,13-diol, R having the same significance as above. This is effected, for example, by treating the diketone with an alkali metal hydride reducing agent such as sodium or lithium borohydride or with sodium or lithium aluminum hydride in a solvent. When substituents in the nature of alcohols or esters are present, an excess of the reducing agent is preferably utilized. A preferred modification comprises stirring the 6,13-diketone in an inert solvent with sodium borohydride or with lithium aluminum hydride and after hydrolysis of the reaction product, extracting with ether the 6,13-diol which has been formed.

Alternatively, the reduction of the 6,13-diketone to the 6,13-diol can be effected by treating the 6,13-diketone with an aluminum alcoholate, such as aluminum isopropylate. In a preferred modification, the 6,13-diketone is treated with aluminum isopropylate and isopropanol in an inert solvent, such as benzene, continuously removing from the reaction mixture the acetone formed.

Depending on the reaction conditions, oxo and acyloxy groups which may be present in the 4-position of the ring, can be reduced or saponified.

The 6,13-diols produced are hard resins or crystalline substances which display characteristic absorption maxima in the ultraviolet spectrum. They are preferably further converted directly without purification.

In the fourth stage of the process, the 6,13-diols obtained as above, if desired, after esterification, are subjected to the removal of two molecules of water or acid while undergoing a concomitant allyl rearrangement. The splitting off of water and rearrangement are accomplished simultaneously by the action of aqueous or water-free hydrohalic acids. Preferably the 6,13-diol is esterified, e. g. acetylated, before the splitting off of water.

A preferred modification comprises treating a solution of the 6,13- diol or a lower alkanoic acid ester thereof in an inert solvent such as ether, methylene chloride, dioxane, etc., with water-free hydrohalic acid, e. g. hydrochloric acid. It is advantageous to work in ethyl ether and to use an excess of alcoholic hydrochloric acid. A small amount of acid is sufficient if the reaction is accelerated by heating.

Another preferred modification comprises treating the 6,13-diol or a lower alkyl ester thereof in a halogenated hydrocarbon with a large dipole moment at a temperature below 0° with aqueous hydrohalic acid. Water or a basic compound is then used to split off hydrogen halide from the halogenated compound produced. Methylene chloride or chloroform may be used as solvents and concentrated aqueous hydrobromic acid may be used as an aqueous hydrohalic acid.

β-Carotene, 3,4-3′,4′-bisdehydro-β-carotene, zeaxanthin, lycopene or their 15,15′-dehydro analogs are thereupon obtained as a product depending upon the initial starting materials as described above. For example, from 1,18-di-(2,6,6-trimethyl-1-cyclohexen-1-yl)- or 1,18-di-(2,6,6-trimethyl-1-cyclohexylidene)-3,7,12,16-tetramethyl-2,4,7,11,14,16-octadecahexaen-9-yne-6,13-diol or their esters there is obtained 15,15′-dehydro-β-carotene; from 1,18-di-(2,6,6-trimethyl-1-cyclohexen-1-yl)- or 1,18-di-(2,6,6-trimethyl-1-cyclohexylidene)-3,7,12,16-tetramethyl-2,4,7,9,11,14,16-octadecaheptaene-6,13-diol there is obtained β-carotene; from 1,18-di-(2,6,6-trimethyl-1-cyclohexen-1-yl)- or 1,18-di-(2,6,6-trimethyl-1-cyclohexylidene) - 3,7,12,16 - tetramethyl - 2,4,7,11,14,16 - octadecahexaen-9-yne-6,13-diol substituted in the 4-position of both rings, or esters thereof, there are obtained 15,15′-dehydrozeaxanthin or esters thereof; from 1,18-di-(2,6,6-trimethyl-1-cyclohexen-1-yl)- or 1,18-di-(2,6,6-trimethyl-1 - cyclohexylidene) 3,7,12,16 - tetramethyl - 2,4,7,9,11-14,16-octadecaheptaene-6,13-diol substituted in the 4-position of both rings, or esters thereof, there are obtained zeaxanthin or esters thereof; from 1,18-di-(2,6,6-trimethyl-1,3 - cyclohexadien-1-yl)-3,7,12,16-tetramethyl - 2,4,7,11,-14,16-octadecahexaen-9-yne-6,13-diol or esters thereof there is obtained 3,4-3′,4′-15,15′-tris-dehydro-β-carotene; from 1,18-di-(2,6,6-trimethyl-1,3-cyclohexadien-1-yl)-3,7,12,16 - tetramethyl - 2,4,7,9,11,14,16 - octadecaheptaene-6,13-diol or esters thereof there is obtained 3,4-3′,4′ - bis - dehydro - β - carotene; from 1,18-di - (2,6,6-trimethyl - 5 - hexen - 1 - ylidene) - 3,7,12,16 - tetramethyl-2,4,7,11,14,16-octadecahexaen-9-yne-6,13-diol or esters thereof there is obtained 15,15′-dehydrolycopene and from 1,18-di-(2,6,6-trimethyl-5-hexen-1-ylidene)-3,7,12,-16 - tetramethyl - 2,4,7,9,11,14,16 - octadecaheptaene-6,13-diol, or esters thereof, there is obtained lycopene.

The 15,15′-dehydro compounds may be converted into their corresponding non-acetylenic analogs by partial hydrogenation of the triple bond by means of a lead-palladium-calcium carbonate catalyst in an inert solvent, such as petroleum ether or acetic acid ethyl ester, and then isomerizing by heating a suspension of the hydrogenated product for several hours at 80–100° C. in a solvent such as benzene or petroleum ether.

Certain dienol ethers and $C_{14}$-acetals utilized as starting materials for the process of the present invention are novel. The preparation of the dienol ethers is exemplified at the end of Examples 1 and 2. The synthesis of some $C_{14}$-acetals is described below:

138 g. of 2,6,6-trimethyl-1-cyclohexen-4-one [which can be made, for example, from isophorone by known procedures, compare Kharasch, Journal of the American Chemical Society, 63 2308 (1941)] in 50 ml. of glacial acetic acid were stirred for two hours at 0–10° with 160° ml. of peracetic acid (containing 530 mg. of peracetic acid per ml.) and the mixture was allowed to stand overnight at 20°. Then, while adding ice, the reaction mixture was made weakly alkaline (pH about 8) by adding 30% aqueous NaOH solution, and the reaction mixture was shaken for one hour at 20°. Then the mixture was extracted twice, each time with 800 ml. of diethyl ether, and the ether solutions were washed once with 200 ml. of saturated ammonium chloride solution. The ether solutions were combined and dried over sodium sulfate, the solvent was driven off, and the residue was distilled in high vacuum. A forerun passed over between 70 and 80°, and then 2,6,6-trimethyl-2-cyclohexen-1-ol-4-one was obtained as an almost colorless oil having B. P. 110–112°/0.1 mm., $n_D^{20}=1.501$, U. V. maximum at 226 m$\mu$ ($E_1^1$=1110 in petroleum ether solution)

after standing for some time. The phenylsemicarbazone had M. P. 189–190°, U. V. maxima at 240.5 m$\mu$ and 285 m$\mu$ ($E_1^1$=807 and 778 in ethanol)

To 154 g. of 2,6,6-trimethyl-2-cyclohexen-1-ol-4-one in 200 ml. of glacial acetic acid and 500 ml. of water were quickly added dropwise 70 g. of chromic anhydride in 200 ml. of water, while stirring and cooling, so that the temperature did not rise above 30°. The mixture was then stirred overnight at 20° C. Then the reaction mixture was saturated with ammonium chloride and was extracted with 1000 ml. of petroleum ether (boiling range 30–60°). The aqueous layer was again extracted in a second separatory funnel with 500 ml. of petroleum ether. The petroleum ether solutions were washed with saturated ammonium chloride solution to which a little ammonia had been added, and then with pure saturated ammonium chloride solution. The washed extracts were dried over sodium sulfate and the solvent was driven off.

The product, 2,6,6-trimethyl-2-cyclohexene-1,4-dione, was distilled under a water pump vacuum; B. P. 92–94°/11 mm., a yellow oil which solidified to crystalline form in the refrigerator, $n_D^{21}=1.490$, U. V. maximum at 238 m$\mu$ ($E_1^1$=942 in petroleum ether)

The phenylsemicarbazone had M. P. 190, then resolidified and melted again at 230°, U. V. maxima at 242.5 m$\mu$ and 325.5 m$\mu$ ($E_1^1$=875 and 580 in ethanol)

65 g. of 2,6,6-trimethyl-2-cyclohexene-1,4-dione in 250 ml. of glacial acetic acid were slowly reacted with 130 g. of zinc dust, while stirring, so that the temperature did not rise above 50°. Then the reaction mixture was stirred for an additional period of one hour. The reaction mixture was filtered, diluted with 1000 ml. of water and then saturated with ammonium chloride. The mixture was extracted twice, each time with 800 ml. of petroleum ether (boiling range 30–60°). The petroleum ether solutions were washed with 300 ml. of saturated ammonium chloride solution to which some ammonia was added, and then were washed with pure saturated ammonium chloride solution. (In case a portion of the product crystallizes from the petroleum ether solution, it is filtered off, the crystalline material is dissolved in diethyl ether, then the diethyl ether solution is washed as indicated above, dried over sodium sulfate and then combined with the petroleum ether solution.) The solvent was driven off until the product 2,6,6-trimethyl-1,4-cyclohexanedione started to crystallize out; colorless needles, M. P. 63–65°, having no absorption maximum in the ultraviolet spectrum between 220 and 280 mµ. The phenyl-semicarbazone had M. P. 218–220°; U. V. maximum at 250 mµ

($E_1^1$=1030 in ethanol)

34.6 g. of 2,6,6-trimethyl-1,4-cyclohexanedione, 100 ml. of benzene, 19 g. of ethylene glycol and 0.2 g. of p-toluene-sulfonic acid were refluxed for seven hours while separating the water which was formed. Upon cooling, the reaction mixture was poured into 300 ml. of 5% sodium bicarbonate solution, and the 2,6,6-trimethyl-4-ethylenedioxy-1-cyclohexanone product was obtained by extraction with diethyl ether and distillation of the extract. The product was obtained as a colorless oil, having B. P. 70°/0.02 mm., $n_D^{21}$=1.469.

To a lithium amide suspension prepared by dissolving 6.7 g. of lithium in 2000 ml. of liquid ammonia was added slowly, while stirring, 52 g. of 1-methoxy-2-methyl-3-butyn-2-ol. The mixture was stirred for one hour and then 79 g. of 2,6,6-trimethyl-4-ethylenedioxy-1-cyclohexanone were added, and the reaction mixture was stirred overnight at the boiling temperature of the ammonia. 60 g. of ammonium chloride were added and then the ammonia was driven off. The residue was taken up in diethyl ether, and insoluble material was filtered off; the ether solution was washed with a saturated solution of ammonium chloride, then was dried over sodium sulfate, and the ether was driven off. The residue was suspended in 450 ml. of petroleum ether and was extracted four times, each time with 300 ml. of 70% methanol. The methanol extracts were washed three times, each time with 150 ml. of petroleum ether, then were diluted with saturated ammonium chloride solution and the precipitated material was taken up in diethyl ether. The ether solution was washed with water, dried over sodium sulfate, and the ether was driven off. There were thus obtained 92 g. of 4-(2,6,6-trimethyl-4-ethylenedioxy-1-hydroxy-1-cyclohexyl)-2-methyl-1-methoxy-3-butyn-2-ol as a yellow viscous oil.

92 g. of the latter were dissolved in 3000 ml. of dry diethyl ether, were mixed while stirring at 0–5° with a solution of 22.5 g. of lithium aluminum hydride in 300 ml. of dry diethyl ether, and the reaction mixture was refluxed for four hours. Then the reaction mixture was cooled with ice, 250 ml. of methanol were added slowly while stirring at 0–5°, and the clear solution was poured into a mixture of 100 g. of ice and 600 ml. of saturated ammonium chloride solution. The precipitated aluminum hydroxide was filtered off and the precipitate was washed with diethyl ether and added to the filtrate. The combined liquors were washed with water, dried over sodium sulfate and the solvents were driven off. The residue was partitioned between petroleum ether and 70% methanol, in the manner indicated above, and from the methanol extracts there were obtained 70 g. of 4-(2,6,6-trimethyl - 4 - ethylenedioxy - 1 - hydroxy - 1 - cyclohexyl)-2-methyl-1-methoxy-3-buten-2-ol as a light yellow, viscous oil.

70 g. of the latter were mixed with 140 ml. of formic acid and the mixture was heated for 25 minutes at 100°. The reaction mixture was poured onto ice and extracted with diethyl ether; the ethreal solution was washed with water and with dilute sodium bicarbonate solution, dried over sodium sulfate, and the ether was driven off. The residue was dissolved in 200 ml. of glacial acetic acid, 26 ml. of water and 32 g. of sodium acetate were added, and the mixture was heated at 95° for two hours. Then it was diluted with ice water, and was extracted with diethyl ether; the ether extract was washed with water and with dilute sodium bicarbonate solution, dried over sodium sulfate and the ether was driven off. The residue was distilled in vacuum, thereby yielding 4-(2,6,6-trimethyl-4-oxo-1-cyclohexylidene)-2-methyl-2-buten-1-al as a yellow oil having B. P. ca. 110°/0.02 mm., $n_D^{21}$=1.555 (U. V. maximum at 284 mµ in petroleum ether).

A solution of 31 g. of 4-(2,6,6-trimethyl-4-oxo-1-cyclohexylidene)-2-methyl-2-buten-1-al in 34 ml. of orthoformic acid ethyl ester and 7 ml. of absolute ethanol was mixed with 0.65 ml. of orthophosphoric acid and 0.05 g. of p-toluenesulfonic acid, and the mixture was allowed to stand for 24 hours at room temperature. 7 ml. of pyridine were added and then the mixture was poured upon ice and dilute sodium bicarbonate solution, the resulting mixture was extracted with petroleum ether, the petroleum ether extract was washed with water, dried over sodium sulfate, the solvent was driven off and the residue was dried in vacuo at 60°. There were thus obtained 40 g. of 4-(2,6,6-trimethyl-4-oxo-1-cyclohexylidene)-2-methyl-1,1-diethoxy-2-butene (U. V. maximum at 248 mµ in the petroleum ether).

40 g. of the latter product were dissolved in 600 ml. of dry diethyl ether and were mixed slowly, while stirring at 0–5°, with a solution of 2.8 g. of lithium aluminum hydride in 40 ml. of diethyl ether. The reaction mixture was stirred for one hour at room temperature, then was cooled to 0–5°; 20 ml. of methanol were added slowly, and the reaction mixture was poured upon ice and saturated ammonium chloride solution. The precipitated aluminum hydroxide was filtered off and washed with diethyl ether, the ether was added to the filtrate, the combined liquors were dried over sodium sulfate and the solvent material was driven off. There were obtained 39.5 g. of 4-(2,6,6-trimethyl-4-hydroxy-1-cyclohexylidene)-2-methyl-1,1-diethoxy-2-butene.

39.5 g. of the latter were acetylated by mixing it with 40 ml. of pyridine and 20 ml. of acetic anhydride and permitting the mixture to stand for 20 hours. The reaction mixture was poured into ice water, extracted with petroleum ether, the organic layer was washed with cold sodium bicarbonate solution, dried over sodium sulfate and the solvent was driven off, yielding 42 g. of 4 - (2,6,6 - trimethyl - 4 - acetoxy - 1 - cyclohexylidene) - 2-methyl-1,1-diethoxy-2-butene.

42 g. of the latter were mixed with 400 ml. of glacial acetic acid, 50 ml. of water and 65 g. of sodium acetate and heated at 95° for three hours. Then the reaction mixture was diluted with ice water and was extracted with diethyl ether. The ethereal solution was washed several times with water, dried over sodium sulfate and the ether was driven off. There were thus obtained 31 g. of 4-(2,6,6-trimethyl-4-acetoxy-1-cyclohexylidene)-2-methyl-2-buten-1-al (U. V. maximum at 284 mµ in petroleum ether).

31 g. of 4 - (2,6,6 - trimethyl-4-acetoxy-1-cyclohexylidene)-2-methyl-2-buten-1-al were dissolved in 40 ml. of toluene, mixed with 16 g. of isopropenyl acetate and 0.2 g. of p-toluenesulfonic acid and the mixture was heated at 120–140° while continuously removing the acetone which was formed. After approximately two hours, the reaction mixture was cooled down, poured into ice water and extracted with petroleum ether. The petroleum ether solution was washed with cold sodium bicarbonate solution and then with water, dried over sodium sulfate and the solvent was distilled off. There were thus obtained 34 g. of 4-(2,6,6-trimethyl-4-acetoxy-1 - cyclohexen - 1 - yl) - 2 - methyl - 1 - acetoxy - 1,3 - butadiene (U. V. maximum at 262 mµ in petroleum ether).

34 g. of the latter were dissolved in 750 ml. of methanol, mixed with 75 ml. of water and 27 g. of sodium bicarbonate and the mixture was refluxed for six hours while stirring. Then the reaction mixture was diluted with ice water, extracted with diethyl ether, the ether solution was washed with water, dried over sodium sulfate and the ether was driven off. In order to insure acetylation of the nuclear hydroxy group, the residue, presumably containing at least some 4-(2,6,6-trimethyl-4 - hydroxy - 1 - cyclohexen - 1 - yl) - 2 - methyl - 2 - buten-1-al, was mixed with 60 ml. of pyridine and 30 ml. of acetic anhydride and the mixture was allowed to stand for 20 hours at room temperature. 100 ml. of ice water were added and the mixture was then extracted with diethyl ether. The ethereal solution was washed with cold sodium bicarbonate solution and then with water, dried over sodium sulfate and the solvent was driven off.

7.3 g. of the 4-(2,6,6-trimethyl-4-acetoxy-1-cyclohexen-1-yl)-2-methyl-2-buten-1-al thus obtained were dissolved in 6.8 ml. of ethyl ortho-formate and there was added a solution of 0.13 ml. of orthophosphoric acid in 1.3 ml. of absolute ethanol. After addition of 0.005 g. of p-toluenesulfonic acid, the reaction mixture was allowed to stand at room temperature for 24 hours. Then 1.5 ml. of pyridine were added and the mixture was poured into a mixture of 100 g. of 5% sodium bicarbonate solution and 20 g. of ice. The product was taken up in ether, the ether extract washed with sodium bicarbonate and water and dried over sodium sulfate. After evaporation of the solvent there was obtained the 1,1 - diethoxy - 4 - (2,6,6 - trimethyl - 4 - acetoxy - 1 - cyclohexen - 1 - yl)-2-methyl-2-butene. From this compound the 1,1 - diethoxy-4-(2,6,6-trimethyl-4-hydroxy-1-cyclohexen-1-yl)-2-methyl-2-butene may be prepared by boiling the former with sodium bicarbonate in 90% aqueous methanol. 1,1 - diethoxy - 4-(2,6,6-trimethyl-4-acetoxy-1-cyclohexen-1-yl)-2-methyl-2-butene may be obtained from the latter by treating at 20° with acetic anhydride in the presence of excess pyridine.

1,1 - diethoxy - 4 - (2,6,6 - trimethyl - 1 - cyclohexylidene)-2-methyl-2-butene, which is a further starting material in this process, can be prepared as follows:

To 250 ml. of dry liquid ammonia were added 50 mg. of ferric nitrate and a few minutes later, while stirring, 50 mg. of lithium. Dry air was blown into the blue solution for one minute. Then, 2.05 g. of lithium were added slowly and awaited after each addition until the blue color of the solution disappeared. Thereupon, 18.75 g. of β-chlorovinyl-ethyl-ether were added while stirring well, and 10 minutes later, 17 g. of 2,6,6-trimethyl-cyclohexanone was dropped in slowly. The mixture was stirred for 44 hours, then slowly reacted with 22.5 g. of ammonium chloride and finally the ammonia was allowed to evaporate. 400 ml. of diethyl ether were then added and the mixture was filtered. The ethereal solution was dried over sodium sulfate, concentrated and the residue was distilled. The distillate was dissolved in 115 ml. of high boiling petroleum ether and shaken with 5 g. of lead-poisoned palladium catalyst in a hydrogen atmosphere at room temperature until the hydrogen uptake ceased. The catalyst was filtered off, the petroleum ether solution was concentrated and the residue was shaken for 1½ hours at room temperature with a mixture of 100 ml. of dioxane, 17.5 ml. of 3 N-sulfuric acid and 7.5 ml. of water. Thereupon the mixture was diluted with water, the product was taken up in petroleum ether and the petroleum ether solution was washed with dilute sodium bicarbonate solution and water, dried over sodium sulfate and concentrated. Upon distillation of the residue there were obtained 8.5 g. of 2,6,6-trimethyl-1-cyclohexylidene acetaldehyde. The latter was acetalized by reaction with orthoformic acid triethyl ester in the presence of p-toluenesulfonic acid, thereby forming 2,6,6 - trimethyl - cyclohexylidene acetaldehyde diethyl acetal. The latter was condensed with ethyl-propenyl ether in the presence of zinc chloride thereby forming 4 - (2,6,6 - trimethyl-1-cyclohexylidene) - 2-methyl-1,1,3-triethoxy-butane. Upon hydrolysis-dialcoholation of the latter by heating with acetic acid and sodium acetate to 100°, 4-(2,6,6-trimethyl-1-cyclohexylidene) - 2 - methyl - 2-buten-1-al was formed. This compound was acetalized as described above with orthoformic acid ethyl ester in the presence of p-toluenesulfonic acid; U. V. absorption maxima at 247.5 mµ in petroleum ether.

The following examples are illustrative of the present invention.

*Example 1*

5.6 g. of 1,1-diethoxy-4-(2,6,6-trimethyl-1-cyclohexen-1-yl)-2-methyl-2-butene were treated gradually with 0.5 ml. of a 10% solution of zinc chloride in ethyl acetate and simultaneously with a solution of 2.45 g. of 3.8-dimethyl-2,9-diethoxy-1,3,7,9-decatetraen-5-yne (M. P. 65°; U. V. maxima at 320 and 340 mµ in petroleum ether) in 10 ml. of dry benzene while stirring at 30–35° and then stirred 18 hours at room temperature. The solvent was distilled off in vacuo. To the 1,18-di-(2,6,6-trimethyl-1-cyclohexen - 1 - yl) - 3,7,12,16 - tetramethyl - 4,6,6,13,13, 15 - hexa - ethoxy - 2,7,11,16 - octadecatetraen - 9 - yne thus obtained were added 10 ml. of dioxane, 27 ml. of 90% acetic acid and 4 g. of sodium acetate and the mixture was heated 5 hours while stirring at 95°, whereby the reaction product slowly began to crystallize. The still warm reaction mixture was diluted with 10 ml. of water and permitted to crystallize at 0–5°. The yellow crystals were filtered under suction, washed with water and dried. The crude 1,18 - di - (2,6,6 - trimethyl - 1 - cyclohexen - 1-yl) - 3,7,12,16 - tetramethyl - 2,4,7,11,14,16 - octadecahexaen-9-yne-6,13-dione was purified by recrystallization from methylene chloride-methanol, M. P. 168–170°; U. V. maxima at 257 and 344 mµ in petroleum ether.

One g. of 1,18 - di - 2,6,6 - trimethyl - 1 - cyclohexen-1 - yl) - 3,7,12,16 - tetramethyl - 2,4,7,11,14,16 - octadecahexaen-9-yne-6,13-dione in 50 ml. of dry ether gradually was treated with a solution of 0.075 g. of lithium aluminum hydride in 15 ml. of dry ether while stirring at about 50° and then stirred at room temperature for one hour. The reaction mixture was then poured over a mixture of 20 g. of ice and 20 ml. of 3 N-sulfuric acid, the organic layer was separated, washed with water and dilute sodium bicarbonate solution, dried over sodium sulfate and evaporated. There was obtained 1 g. of 1,18-di-(2,6,6 - trimethyl - 1 - cyclohexen - 1 - yl) - 3,7,12,16-tetramethyl - 2,4,7,11,14,16 - octadecahexaen - 9 - yne-6,13-diol as a yellowish resin, which became crystalline on standing (U. V. absorption maxima at 242 and 282 mµ in petroleum ether).

The diol obtained above was directly converted without further purification by dissolving in 20 ml. of ether, treating with 2 ml. of 23.7% alcoholic hydrochloric acid and 4 ml. of alcohol. The solution was left standing at room temperature for 2 hours and an additional 18 hours at 0 to 5°. The crystals which formed were then filtered under suction, washed with methanol and petroleum ether and dried. The 15,15'-dehydro-β-carotene obtained melted at 154–155° (U. V. maxima at 431 and 457 mµ in petroleum ether).

The 3,8 - dimethyl - 2,9 - diethoxy - 1,3,7,9 - decatetraen-5-yne used as a starting material was prepared as follows:

A solution of 162 g. of 2,7-dimethyl-2,6-octadien-4-yne-1,8-dial in 1600 ml. of absolute diethyl ether was treated with 250 g. of methyl magnesium bromide. The condensation product was hydrolyzed and 3,8-dimethyl-2,9-dihydroxy-3,7-decadien-5-yne was obtained. 100 g. of 3,8 - dimethyl - 2,9 - dihydroxy - 3,7 - decatrien - 5 - yne were shaken for 15 hours in methylene chloride solution with 1500 g. of manganese dioxide. 45 g. of 3,8-dimethyl-2,9-dioxo-2,7-decadien-5-yne thus produced were suspended in 65 ml. of orthoformic acid ethyl ester. After addition of a solution of 0.08 g. of p-toluenesulfonic acid in 8 ml. of ethanol, the mixture was stirred for 48 hours at room temperature.

33.8 g. of the acetal formed were then heated in a toluene solution at 100° for 2 hours with 15.3 g. of phosphorus oxychloride in the presence of excess pyridine. The 3,8 - dimethyl - 2,9 - diethoxy - 1,3,7,9 - decatetraen-5-yne formed showed U. V. absorption maxima at 320 and 340 mµ (in petroleum ether).

*Example 2*

9 g. of 1,1 - diethoxy - 4 - (2,6,6 - trimethyl - 1 - cyclohexen-1-yl)-2-methyl-2-butene were condensed as described in Example 1 with 1 ml. of a 10% zinc chloride-ethyl acetate solution and 4 g. of 3,8-dimethyl-2,9-diethoxy - 1,3,5,7,9 - decapentaene (U. V. maxima at 320, 334 and 350 mμ in petroleum ether) in 10 ml. of benzene. The 1,18 - di - (2,6,6 - trimethyl - 1 - cyclohexen - 1 - yl)- 3,7,12,16 - tetramethyl - 4,6,6,13,13,15 - hexa - ethoxy-2,7,9,11,16 - octadecapentaene thus obtained was then hydrolyzed with 15 ml. of dioxane, 50 ml. of 90% acetic acid and 8 g. of sodium acetate. The 1,18 - di - (2,6,6-trimethyl - 1 - cyclohexen - 1 - yl) - 3,7,12,16 - tetramethyl - 2,4,7,9,11,14,16 - octadecaheptaene - 6,13 - dione was purified by crystallization from methylene chloride-methanol, M. P. 178° (U. V. maxima at 256 and 359 mμ in petroleum ether).

One g. of 1,18 - di - (2,6,6 - trimethyl - 1 - cyclohexen-1 - yl) - 3,7,12,16 - tetramethyl - 2,4,7,9,11,14,16 - octadecaheptaene-6,13-dione was reduced as described in Example 1 with 0.075 g. of lithium aluminum hydride and similarly worked up. There was obtained 1,18-di-(2,6,6-trimethyl - 1 - cyclohexen - 1 - yl) - 3,7,12,16 - tetramethyl - 2,4,7,9,11,14,16 - octadecaheptaene - 6,13 - diol (U. V. absorption maxima at 242 and 294 mμ in petroleum ether). Without further purification the product thus obtained was dehydrated with alcoholic hydrochloric acid in ether solution as described in Example 1. There was obtained β-carotene, M. P. 180° (U. V. maxima at 452–453 and 480–481 mμ in petroleum ether).

The 3,8 - dimethyl - 2,9 - diethoxy - 1,3,5,7,9 - decapentaene required as a starting compound was prepared in the following manner from 3,8-dimethyl-2,9-diethoxy-1,3,7,9-decatetraen-5-yne [the synthesis of which is described at the end of Example 1]:

6 g. of 3,8 - dimethyl - 2,9 - diethoxy - 1,3,7,9 - decatetraen-5-yne were dissolved in 90 ml. of petroleum ether (boiling range 80–100°). The solution was then shaken at room temperature with 1 g. of lead-palladium catalyst (Lindlar, Helv. Chim. Acta 35, 446 [1952] and 0.1 ml. quinoline in a hydrogen atmosphere. After 1 mol of hydrogen was taken up, the catalyst was separated by filtration and the petroleum ether solution was washed with cold dilute sulfuric acid and with water, dried over sodium sulfate and the solvent was driven off. The 3,8-dimethyl-2,9 - diethoxy - 1,3,5,7,9 - decapentaene can be recrystallized from petroleum ether; U. V. absorption maxima at 320, 334 and 350 mμ (in petroleum ether solution).

*Example 3*

4.2 g. of 1,1-diethoxy-4-(2,6,6-trimethyl-4-oxo-cyclohexylidene)-2-methyl-2-butene were dissolved in 5 ml. of dry petroleum ether and condensed as described in Example 1 with 0.5 ml. of zinc chloride-ethyl acetate solution and 1.8 g. of 3,8-dimethyl-2,9-diethoxy-1,3,7,9-decatetraen-5-yne in 10 ml. of dry petroleum ether. The product was then hydrolyzed with 10 ml. of dioxane, 27 ml. of 90% acetic acid and 4 g. of sodium acetate for 5 hours at 95°. The reaction solution was then diluted with water and extracted with ether-methylene chloride (4:1). The ether solution was washed with water and sodium bicarbonate solution, dried over sodium sulfate and evaporated. There was obtained 1,18-di-(2,6,6-trimethyl-4-oxo-1-cyclohexylidene)-3,7,12,16-tetramethyl-2,4,7,11,14,16-octadecahexaen-9-yne-6,13-dione which was purified by chromatography (U. V. absorption maxima at 258, 292–293 and 368 mμ in petroleum ether).

3.3 g. of 1,18-di-(2,6,6-trimethyl-4-oxo-1-cyclohexylidene) - 3,7,12,16 -tetramethyl - 2,4,7,11,14,16 - octadecahexaen-9-yne-6,13-dione in 50 ml. of dry ether were reduced as described in Example 1 with 0.4 g. of lithium aluminum hydride and similarly worked up. There was obtained 1,18-di-(2,6,6-trimethyl-4-hydroxy-1-cyclohexylidene) - 3,7,12,16 - tetramethyl - 2,4,7,11,14,16 - octadecahexaen-9-yne-6,13-diol as a yellowish resin (U. V. absorption maximum at 292 mμ in petroleum ether).

The product obtained above was dissolved in 10 ml. of pyridine, treated with 3 ml. of acetic anhydride and let stand for 20 hours at room temperature under nitrogen atmosphere. The reaction mixture was then diluted with 50 ml. of cold water, extracted with ether, the ether solution was washed with cold 1 N-hydrochloric acid, with cold dilute sodium bicarbonate solution and with water, dried over sodium sulfate and the ether was then distilled off. There was obtained 1,18-di-(2,6,6-trimethyl-4-acetoxy-1-cyclohexylidene)-3,7,12,16-tetramethyl-6,13-diacetoxy-2,4,7,11,14,16-octadecahexaen-9-yne as a yellow resin (U. V. absorption maximum at 292 mμ in petroleum ether).

The product obtained was dehydrated without purification by dissolving in 45 ml. of methylene chloride and 1.8 ml. of glacial acetic acid. The solution was treated with 1.8 ml. of 60% hydrobromic acid within 20 seconds at −40° under vigorous stirring. The mixture was strongly agitated another 90 seconds at −35°, 45 ml. of water were added and the mixture was stirred for an additional 3 hours at 0–5° in carbon dioxide atmosphere. The methylene chloride solution was then separated, washed with dilute sodium bicarbonate solution and water, dried over sodium sulfate and evaporated. The residue was dissolved in 30 ml. of ether, treated with a solution of 5 g. of potassium hydroxide in 50 ml. of methanol and agitated for 6 hours in a nitrogen atmosphere. The mixture was then diluted with water, the ether solution was washed 3 times with water, dried over sodium sulfate and evaporated. The crude product obtained was chromatographed on aluminum oxide (Brockmann, activity state II). The 15,15'-dehydro-zeaxanthin thus obtained was eluted with a mixture of equal parts of methylene chloride and petroleum ether and then purified by recrystallization from methylene chloride-petroleum ether and methylene chloride-methanol, M. P. 207–208° (U. V. absorption maxima at 430 and 458 mμ in petroleum ether).

*Example 4*

8.6 g. of 1,1-diethoxy-4-(2,6,6-trimethyl-4-acetoxy-1-cyclohexen-1-yl)-2-methyl-2-butene were condensed as described in Example 1 with 0.75 ml. of zinc chloride-ethyl acetate solution and 3.5 g. of 3,8-dimethyl-2,9-diethoxy-1,3,7,9-decatetraen-5-yne, then hydrolyzed as described in Example 3 with 14 ml. of dioxane, 40 ml. of 90% acetic acid and 6 g. of sodium acetate and then worked up as described in the same example. The crude 1,18-di-(2,6,6-trimethyl-4-acetoxy-1-cyclohexen - 1 - yl) - 3,7,12,16-tetramethyl-2,4,7,11,14,16-octadecahexaen-9 - yne - 6,13-dione (U. V. maxima at 256 and 244 mμ) obtained was reduced with lithium aluminum hydride without further purification as described in Example 3. The crude 1,18-di-)2,6,-6-trimethyl-4-hydroxy-1-cyclohexen-1-yl)-3,7,12,16 - tetramethyl-2,4,7,11,14,16-octadecahexaen-9-yne-6,13-diol obtained was acetylated with acetic anhydride-pyridine, dehydrated with hydrobromic acid in methylene chloride and saponified with alkali. Following chromatography and crystallization from methylene chloride-petroleum ether, 15,15'-dehydrozeaxanthin was obtained, M. P. 207–208°.

*Example 5*

131 g. of 1,18-di-(2,6,6-trimethyl-1-cyclohexen-1-yl)-3,7,12,16 - decamethyl - 2,4,7,11,14,16 - octadecahexaen-9-yne-6,13-dione (the preparation of which is described in Example 1) were boiled with 131 g. of aluminum isopropylate in a mixture of 450 ml. of dry benzene and 1100 ml. of dry isopropanol for 5 to 6 hours in a nitrogen atmosphere, continuously distilling off the acetone formed. The reaction mixture was cooled down, poured on a mixture of 400 ml. of 3 N-hydrochloric acid and 200 g. of ice and was then extracted with 1000 ml. of diethyl ether. The ethereal solution was washed 3 times with water, dried over sodium sulfate and the solvent was driven off. There were thus obtained 131 g. of 1,18-di-(2,6,6-trimethyl-cyclohexen-1-yl)-3,7,12,16-tetramethyl-2, 4,7,11,14,16-octadecahexaen-9-yne-6,13-diol which—without further purification—was dehydrated in ethereal solution with alcoholic hydrochloric acid, as indicated in Example 1. There were obtained 93 g. of 15,15'-dehydro-β-carotene of M. P. 154–155°.

Example 6

14.5 g. of 1,18-di-(2,6,6-trimethyl-4-oxo-cyclohexylidene) - 3,7,12,16 - tetramethyl - 2,4,7,11,14,16 - octadecahexaen-9-yne-6,13-dione (prepared according to the procedure described in Example 3) were boiled for 5 to 6 hours in nitrogen atmosphere with 14 g. of aluminum isopropylate, 90 ml. of dry benzene and 200 ml. of dry isopropanol, continuously distilling off the acetone formed. The reaction mixture was cooled down and poured on a mixture of 50 ml. of 3-N-hydrochloric acid and 50 ml. of ice and was then extracted with diethyl ether. The ethereal solution was washed with water so as to show neutral reaction, was dried on sodium sulfate and the solvent was driven off. There were thus obtained 14.8 g. of 1,18-di-(2,6,6-trimethyl-4-hydroxy-cyclohexylidene) - 3,7,12,16 - tetramethyl - 2,4,7,11,14,16 - octadecahexaen-9-yne-6,13-diol which was directly used for the next step without further purification.

The diol obtained was dissolved in 150 ml. of diethyl ether and 30 ml. of ethanol. There were then added 15 ml. of 23.7% alcoholic hydrochloric acid and the mixture was allowed to stand for 3 hours at room temperature and for further 18 hours at 0–5°. The crystals formed were separated by filtration and recrystallized from a mixture of ethyl acetate and methanol. There were thus obtained orange-red crystals of 15,15'-dehydrozeaxanthin; M. P. 207–208°.

Example 7

22.4 g. of 1,1-diethoxy-4-(2,6,6-trimethyl-4-acetoxy-1-cyclohexen - 1 - yl) - 2 - methyl-2-butene-acetal were condensed—as described in Example 1—with 9.8 g. of 3,8-dimethyl-2,9-diethoxy-1,3,7,9-decatetraen-5-yne in the presence of zinc chloride, and the condensation product was hydrolized as described in Example 1 with 90% acetic acid in the presence of sodium acetate. There were obtained yellow needles of 1,18-di-(2,6,6-trimethyl-4 - acetoxy - 1 - cyclohexen - 1 - yl) - 3,7,12,16 - tetramethyl - 2,4,7,11,14,16 - octadecahexaen - 9 - yne - 6,13-dione; M. P. after recrystallization from ethyl acetate or from a mixture of methylene chloride and methanol: 174–175°; U. V. maxima at 254 and 343 mμ in petroleum ether.

5.2 g. of 1,18-di-(2,6,6-trimethyl-4-acetoxy-1-cyclohexen - 1 - yl) - 3,7,12,16 - tetramethyl - 2,4,7,11,14,16-octadecahexaen-9-yne-6,13-dione were reduced as described in Example 5 with 5.2 g. of aluminum isopropylate in a benzene-isopropanol solution. The crude reaction product was then dehydrated without purification by dissolving in 100 ml. of methylene chloride and 3 ml. of glacial acetic acid. The solution was energetically stirred at −40° while adding within 20 seconds 3.2 ml. of 60% hydrobromic acid. The mixture was agitated another 90 seconds at −35°, 100 ml. of water were added quickly and the mixture was stirred for an additional 3 hours at 0–5° in carbon dioxide atmosphere. After addition of 200 ml. of methylene chloride the organic layer was separated, washed with water, dried over sodium sulfate and the solvent was driven off. The crystalline residue was recrystallized from methylene chloride-methanol. There was thus obtained 15,15'-dehydro-zeaxanthine of M. P. 207–208°; U. V. maxima at 430 and 458 mμ in petroleum ether.

Example 8

22.4 g. of 1,1 - diethoxy - 4 - (2,6,6-trimethyl-1,3-cyclohexadien-1-yl)-2-methyl-2-butene were condensed with 9.8 g. of 3,8-dimethyl-2,9-diethoxy-1,3,7,9-decatetraen-5-yne and hydrolized with acetic acid and sodium acetate as described in Example 1. There were obtained yellow needles of 1,18-di-(2,6,6-trimethyl-1,3-cyclohexadien-1-yl) - 3,7,12,16 - tetramethyl - 2,4,7,11,14,16 - octadecahexaen-9-yne-6,13-dione which were recrystalized from methylene chloride-methanol, M. P. 153–154°; U. V. maxima at 267 and 344 mμ (in petroleum ether solution).

4 g. of 1,18-di-(2,6,6-trimethyl-1,3-cyclohexadien-1-yl)-3,7,12,16 - tetramethyl - 2,4,7,11,14,16 - octadecahexaen-9-yne-6,13-dione were reduced as described in Example 5 with aluminum isopropylate in benzene-isopropanol solution and the 1,18-di-(2,6,6-trimethyl-1,3-cyclohexadien-1-yl) - 3,7,12,16 - tetramethyl - 2,4,7,11,14,16 - octadecahexaen-9-yne-6,13-diol obtained was dehydrated without purification with alcoholic hydrochloric acid in diethyl ether solution. After recrystallization of the product formed from methylene chloride-methanol, there were obtained red-violet crystals of 3,4-3',4'-15,15'-trisdehydro-β-carotene, M. P. 165–167°; U. V. maximum at 449 mμ in petroleum ether solution.

We claim:

1. A process which comprises condensing bilaterally at 15 to 50° C. in an inert solvent and in the presence of a metal halide acid condensation agent a member of the group consisting of 3,8-dimethyl-2,9-di-loweralkoxy-1,3,5,7,9-decapentaene and 3,8-dimethyl-2,9-di-loweralkoxy-1,3,7,9-decatetraen-5-yne with 1,1-di-loweralkoxy-2-methyl-4-R-2-butene wherein R represents a member of the group consisting of the radicals 2,6,6-trimethyl-4-$R^1$-1-cyclohexylidene, 2,6,6-trimethyl-4-$R^2$-1-cyclohexen-1-yl and 2,6,6-trimethyl-1,3-cyclohexadien-1-yl, said $R^1$ representing a member of the group consisting of hydrogen, oxo, hydroxy and lower alkanoyloxy, and said $R^2$ representing a member of the group consisting of hydrogen, hydroxy and lower alkanoyloxy, to produce a member of the group consisting of 1,18-di-R-3,7,12,16-tetramethyl - 4,6,6,13,13,15 - hexa - loweralkoxy - 2,7,9,11,16 - octadecapentaene and 1,18 - di-R-3,7,12,16-tetramethyl - 4,6,6,13,13,15 - hexa - loweralkoxy - 2,7,11,16-octadecatetraen-9-yne wherein R has the same significance defined above, hydrolyzing and dealcoholizing the product thus obtained in the presence of acid to produce a member of the group consisting of 1,18-di-R-3,7,12,16-tetramethyl - 2,4,7,9,11,14,16 - octadecaheptaene - 6,13-dione and 1,18-di-R-3,7,12,16-tetramethyl-2,4,7,11,14,16-octadecahexaen-9-yne-6,13-dione, wherein R has the same significance defined above, catalytically reducing the 6,13-dione thus obtained to the corresponding 6,13-diol and dehydrating the 6,13-diol with acid whereby two molecules of water are split off with concomitant allyl rearrangement.

2. A process which comprises bilaterally condensing at 15 to 50° C. in an inert solvent and in the presence of a metal halide acid condensation agent 3,8-dimethyl-2,9-diethoxy-1,3,5,7,9-decapentaene with 1,1-diethoxy-4-(2,6,6,-trimethyl - 1 - cyclohexen-1-yl)-2-methyl-2-butene to produce 1,18-di-(2,6,6-trimethyl - 1 - cyclohexen-1-yl)-3,7,12,16 - tetramethyl-4,6,6,13,13,15-hexaethoxy-2,7,9,11,16-octadecapentaene, hydrolyzing and dealcoholizing the product thus obtained in the presence of acid to produce 1,18-di-(2,6,6-trimethyl-1-cyclohexen - 1 - yl) - 3,7,12,16-tetramethyl-2,4,7,9,11,14,16-octadecaheptaene-6,13-dione, catalytically reducing the 6,13-dione thus obtained to the corresponding 6,13-diol and treating the 6,13-diol with acid whereby two molecules of water are split off with concomitant allyl rearrangement producing β-carotene.

3. A process which comprises bilaterally condensing at 15 to 50° C. in an inert solvent and in the presence of a metal halide acid condensation agent 3,8-dimethyl-2,9-diethoxy-1,3,7,9-decatetraen-5-yne with 1,1-diethoxy-4-(2,6,6 - trimethyl-4-oxo-1-cyclohexylidene)-2-methyl-2-butene to produce 1,18-di-(2,6,6 - trimethyl-4-oxo-1-cyclohexylidene) - 3,7,12,16 - tetramethyl-4,6,6,13,13,15-hexaethoxy-2,7,9,11,16-octadecapentaene, hydrolyzing and dealcoholizing the product thus obtained in the presence of acid to produce 1,18-di-(2,6,6 - trimethyl-4-oxo-1-cyclohexylidene)-3,7,12,16 - tetramethyl-2,4,7,11,14,16-octadecahexaen-9-yne-6,13-dione, catalytically reducing the 6,13-dione thus obtained, esterifying the product with a lower alkanoic acid and treating the latter with acid producing 15,15′-dehydrozeaxanthin.

4. A process which comprises bilaterally condensing at 15 to 50° C. in an inert solvent and in the presence of a metal halide acid condensation agent a member of the group consisting of 3,8-dimethyl-2,9-di-loweralkoxy-1,3,5,7,9-decapentaene and 3,8-dimethyl-2,9-di-loweralkoxy-1,3,7,9-decatetraen-5-yne with 1,1-di-loweralkoxy-2-methyl-4-R-2-butene wherein R represents a member of the group consisting of the radicals 2,6,6-trimethyl-4-$R^1$-1-cyclohexylidene, 2,6,6-trimethyl-4-$R^2$-1-cyclohexen-1-yl, and 2,6,6-trimethyl-1,3-cyclohexadien-1-yl, said $R^1$ representing a member of the group consisting of hydrogen, oxo, hydroxy and lower alkanoyloxy, and said $R^2$ representing a member of the group consisting of hydrogen, hydroxy and lower alkanoyloxy, to produce a member of the group consisting of 1,18-di-R-3,7,12,16-tetramethyl-4,6,6,13,13,15-hexa-loweralkoxy-2,7,9,11,16-octadecapentaene and 1,18-di-R-3,7,12,16-tetramethyl - 4,6,6,13,13,15-hexa-loweralkoxy-2,7,11,16-octadecatetraen-9-yne wherein R has the same significance defined above.

5. A process which comprises hydrolyzing in the presence of acid a member of the group consisting of 1,18-di-R-3,7,12,16-tetramethyl-4,6,6,13,13,15 - hexa - loweralkoxy-2,7,9,11,16 - octadecapentaene and 1,18-di-R-3,7,12,16-tetramethyl-4,6,6,13,13,15-hexa-loweralkoxy-2,7,11,16-octadecatetraen-9-yne wherein R represents a member of the group consisting of the radicals 2,6,6-trimethyl-4-$R^1$-1-cyclohexylidene, 2,6,6-trimethyl-4-$R^2$-1-cyclohexen-1-yl and 2,6,6-trimethyl-1,3-cyclohexadien-1-yl said $R^1$ representing a member of the group consisting of hydrogen, oxo, hydroxy and lower alkanoyloxy, and said $R^2$ representing a member of the group consisting of hydrogen, hydroxy and lower alkanoyloxy, to produce a member of the group consisting of 1,18-di-R-3,7,12,16-tetramethyl-2,4,7,9,11,14,16-octadecaheptaene-6,13-dione and 1,18-di-R-3,7,12,16 - tetramethyl - 2,4,7,11,14,16-octadecahexaen-9-yne-6,13-dione wherein R has the same significance defined above.

6. A process which comprises catalytically reducing the oxo groups to hydroxy groups of a member of the group consisting of 1,18-di-R-3,7,12,16-tetramethyl - 2,4,7,9,11,14,16-octadecaheptaen - 6,13 - dione and 1,18-di-R-3,7,12,16-tetramethyl-2,4,7,11,14,16-octadecahexaen - 9 - yne - 6,13-dione wherein R is a member of the group consisting of the radicals 2,6,6-trimethyl-4-$R^1$-1-cyclohexylidene 2,6,6-trimethyl-4-$R^2$-1-cyclohexen-1-yl and 2,6,6-trimethyl-1,3-cyclohexadien-1-yl, said $R^1$ representing a member of the group consisting of hydrogen, oxo, hydroxy and lower alkanoyloxy, and said $R^2$ representing a member of the group consisting of hydrogen, hydroxy and lower alkanoyloxy.

7. A process which comprises treating a member of the group consisting of 1,18-di-R-3,7,12,16-tetramethyl-2,4,7,9,11,14,16 - octadecaheptaen-6,13-diol and 1,18-di-R-3,7,12,16-tetramethyl-2,4,7,11,14,16-octadecahexaen - 9 - yne-6,13-diol wherein R represents a member of the group consisting of the radicals 2,6,6-trimethyl-4-$R^2$-1-cyclohexylidene, 2,6,6-trimethyl-4-$R^2$-1-cyclohexen-1-yl and 2,6,6-trimethyl-1,3-cyclohexadien-1-yl, said $R^2$ representing a member of the group consisting of hydroxy and lower alkanoyloxy, with acid whereby two molecules of water are split off with concomitant allyl rearrangement.

8. A process which comprises dehydrating 1,18-di-(2,6,6-trimethyl-1-cyclohexen-1-yl)-3,7,12,16 - tetramethyl-2,4,7,9,11,14,16-octadecaheptaen-6,13-diol with alcoholic hydrochloric acid to produce β-carotene.

9. 3,8-dimethyl-2,9-di-loweralkoxy-1,3,5,7,9-decapentaene.

10. 3,8-dimethyl-2,9-diethoxy-1,3,5,7,9-decapentaene.

11. 3,8-dimethyl-2,9-di-loweralkoxy-1,3,7,9-decatetraen-5-yne.

12. 3,8-dimethyl-2,9-diethoxy-1,3,7,9-decatetraen-5-yne.

13. A member of the group consisting of 1,18-di-R-3,7,12,16-tetramethyl - 4,6,6,13,13,15 - hexa-loweralkoxy-2,7,9,11,16-octadecapentaene and 1,18-di-R-3,7,12,16-tetramethyl-4,6,6,13,13,15 - hexa-loweralkoxy - 2,7,11,16-octadecatetraen-9-yne wherein R represents a member of the group consisting of the radicals 2,6,6-trimethyl-4-$R^1$-1-cyclohexylidene, 2,6,6-trimethyl-4-$R^2$-1-cyclohexen-1-yl and 2,6,6-trimethyl-1,3-cyclohexadien-1-yl, said $R^1$ representing a member of the group consisting of hydrogen, oxo, hydroxy and lower alkanoyloxy, and said $R^2$ representing a member of the group consisting of hydrogen, hydroxy and lower alkanoyloxy.

14. A member of the group consisting of 1,18-di-R-3,7,12,16-tetramethyl - 2,4,7,9,11,14,16 - octadecaheptaen-6,13-dione and 1,18-di-R - 3,7,12,16 - tetramethyl-2,4,7,11,14,16-octadecahexaen-9-yne-6,13-dione wherein R represents a member of the group consisting of the radicals 2,6,6-trimethyl-4-$R^1$-1-cyclohexylidene, 2,6,6-trimethyl-4-$R^2$-1-cyclohexen-1-yl and 2,6,6-trimethyl-1,3-cyclohexadien-1-yl, said $R^1$ representing a member of the group consisting of hydrogen, oxo, hydroxy and lower alkanoyloxy, and said $R^2$ representing a member of the group consisting of hydrogen, hydroxy and lower alkanoyloxy.

15. 1,18 - di - [2,6,6 - trimethyl - 1 - cyclohexen-1-yl]-3,7,12,16 - tetramethyl - 2,4,7,11,14,16 - octadecahexaen-9-yne-6,13-dione.

16. 1,18-di-[2,6,6-trimethyl - 1,3 - cyclohexadien-1-yl]-3,7,12,16 - tetramethyl - 2,4,7,11,14,16 - octadecahexaen-9-yne-6,13-dione.

17. 1,18-di-[2,6,6-trimethyl - 4 - acetoxy-1-cyclohexen-1-yl] - 3,7,12,16 - tetramethyl - 2,4,7,11,14,16 - octadecahexaen-9-yne-6,13-dione.

18. 1,18-di-[2,6,6 - trimethyl-4-oxo-1-cyclohexylidene]-3,7,12,16 - tetramethyl - 2,4,7,11,14,16 - octadecahexaen-9-yne-6,13-dione.

19. 1,18-di - [2,6,6 - trimethyl - 1 - cyclohexen-1-yl]-3,7,12,16-tetramethyl - 2,4,7,9,11,14,16 - octadecaheptaen-6,13-dione.

20. A member of the group consisting of 1,18-di-R-3,7,12,16-tetramethyl - 2,4,7,9,11,14,16 - octadecaheptaen-6,13-diol and 1,18-di-R-3,7,12,16-tetramethyl-2,4,7,11,14,16-octadecahexaen-9-yne-6,13-diol wherein R represents a member of the group consisting of the radicals 2,6,6-trimethyl-4-$R^2$-1-cyclohexylidene, 2,6,6-trimethyl-4-$R^2$-1-cyclohexen-1-yl and 2,6,6-trimethyl-1,3-cyclohexadien-1-yl, said $R^2$ representing a member of the group consisting of hydrogen, hydroxy and lower alkanoyloxy.

References Cited in the file of this patent
UNITED STATES PATENTS

| | | |
|---|---|---|
| 2,609,396 | Inhoffen et al. | Sept. 2, 1952 |
| 2,671,112 | Inhoffen et al. | Mar. 2, 1954 |
| 2,730,549 | Isler et al. | Jan. 10, 1956 |

UNITED STATES PATENT OFFICE
Certificate of Correction

Patent No. 2,857,423                                                               October 21, 1958

Otto Isler et al.

It is hereby certified that error appears in the printed specification of the above numbered patent requiring correction and that the said Letters Patent should read as corrected below.

Column 1, line 24, for "corotene" read *carotene*; column 2, line 12, for "$C^{40}$" read $C_{40}$; columns 1 and 2, first formula after the second plus sign, for

same columns 1 and 2, second formula, for "$OR_3$", in three occurrences, read $OR^s$; column 3, lines 27 to 29, strike out "1,1-diethoxy-4-(2,6,6-trimethyl-4-acetoxy-1-cyclohexylidene)-2-methyl-2-butene(zeaxanthin)"; line 31, for "methyl-2-2-butene" read *methyl-2-butene*; column 4, line 54, for "sodium", both occurrences, read *sodium-*; column 5, line 46, for ") 3,7" read *)-3,7*; column 6, line 6, for "160° ml." read *160 ml.*; same column 6, line 54, and column 7, line 3, after the closing parenthesis, in each occurrence, insert a period; column 7, line 61, for "ethreal" read *ethereal*; column 8, line 14, after "in" strike out "the"; column 10, line 5, for "3.8" read *3,8*; line 25, for "di-2,6,6-" read *di-(2,6,6-*; column 11, line 38, for "1952] and" read *1952]) and*; line 49, for "oxo-cyclo-" read *oxo-1-cyclo-*; column 12, line 75, for "trimethyl-cyclohexen" read *trimethyl-1-cyclohexen*; column 13, line 16, for "3-N" read *3N*; column 14, line 4, for "recrystalized" read *recrystallized*; column 15, line 49, for "cyclohexylidene 2" read *cyclohexylidene, 2*.

Signed and sealed this 20th day of January 1959.

[SEAL]

Attest:
KARL H. AXLINE,
*Attesting Officer.*

ROBERT C. WATSON,
*Commissioner of Patents.*